United States Patent [19]

Takahashi et al.

[11] Patent Number: 4,822,634
[45] Date of Patent: Apr. 18, 1989

[54] LONGITUDINAL MAGNETIC COATED RECORDING MEDIUM

[75] Inventors: Jun Takahashi, Zama; Shigeru Fukushima, Tokyo; Toshikatu Narumi, Kawasaki; Ken-ich Itoh, Yamato; Seiya Ogawa, Kawasaki, all of Japan

[73] Assignee: Fujitsu Limited, Kawasaki, Japan

[21] Appl. No.: 39,226

[22] Filed: Apr. 17, 1987

Related U.S. Application Data

[62] Division of Ser. No. 863,039, May 14, 1986, Pat. No. 4,746,569.

[30] Foreign Application Priority Data

| May 20, 1985 | [JP] | Japan | 60-107635 |
| Sep. 3, 1985 | [JP] | Japan | 60-194076 |
| Apr. 7, 1986 | [JP] | Japan | 61-78159 |
| Apr. 7, 1986 | [JP] | Japan | 61-78160 |
| Apr. 8, 1986 | [JP] | Japan | 61-79170 |
| Apr. 9, 1986 | [JP] | Japan | 61-80064 |
| Apr. 9, 1986 | [JP] | Japan | 61-80065 |

[51] Int. Cl.$^4$ ............................................. G11B 5/70
[52] U.S. Cl. .................................... 427/48; 427/130; 427/240; 427/372.2; 428/694; 428/900
[58] Field of Search ............... 428/694, 323, 900; 427/48, 130, 372.2, 240

[56] References Cited

U.S. PATENT DOCUMENTS

| 4,482,578 | 11/1984 | Akoshi et al. | 427/48 |
| 4,518,627 | 5/1985 | Foley et al. | 427/130 |
| 4,552,808 | 11/1985 | Fujiyama et al. | 427/128 |
| 4,578,280 | 3/1986 | Greiner et al. | 427/48 |
| 4,696,831 | 9/1987 | Sakaguchi et al. | 427/48 |
| 4,699,840 | 10/1987 | Yashiro et al. | 428/694 |

*Primary Examiner*—Paul J. Thibodeau
*Attorney, Agent, or Firm*—Staas & Halsey

[57] ABSTRACT

A longitudinal magnetic coated recording medium includes at least planar magnetic particles, each having an easy magnetization axis perpendicular to the planar surface thereof, preferably mixed with other particles, and dispersed in a magnetic film formed on a nonmagnetic substrate, having a orientation angle of $-30°$ to $+30°$. A process for producing such a recording medium includes the step of orienting the planar magnetic particles by applying a magnetic field approximately in parallel to the surface of the magnetic film.

10 Claims, 12 Drawing Sheets

LONGITUDINAL MAGNETIC COATED RECORDING MEDIUM

This is a divisional of co-pending application Ser. No. 863,039, filed on May 14, 1986, now U.S. Pat. No. 4,746,569.

BACKGROUND OF THE INVENTION

1. Field of the Invention

The present invention relates to a process for producing a so-called longitudinal magnetic coated recording medium.

2. Description of the Prior Art

A magnetic recording medium comprises a magnetic film which is formed on a nonmagnetic substrate and contains magnetic particles dispersed therein. The easy magnetization axis of the magnetic particles may be oriented either in parallel to or perpendicular to the surface of the magnetic film. Acicular magnetic particles e.g., $\gamma$-$Fe_2O_3$, are commonly used for dispersion in a magnetic film. Such magnetic particles have an easy magnetization axis in the direction of its longitudinal axis, and tend easily to orient in a direction in parallel to the surface of the magnetic film. Thus, their magnetic orientation is parallel to the surface of the magnetic film, hereinafter referred to as longitudinal orientation.

Figure 1:
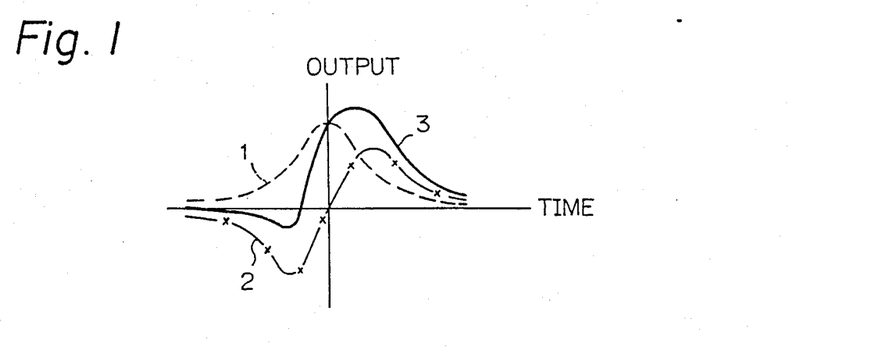
FIG. 1 is a graph of output waves detected by a ring head.
Figure 2:
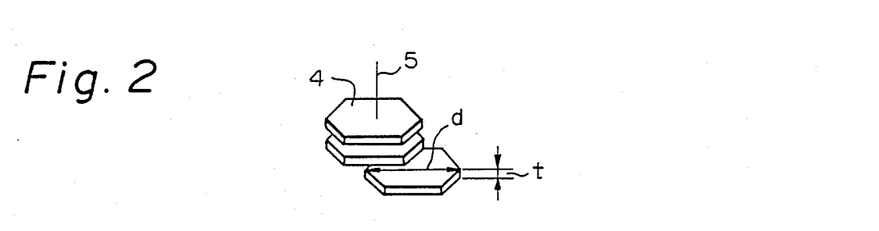
FIG. 2 is a perspective view of a planar magnetic particle having an easy magnetization axis perpendicular to the major surface of the plane.

When information is written in and read out of a longitudinal magnetic film by means of a ring head, the magnetic fluxes which a detecting ring head bisects are almost parallel to the surface of the magnetic film, and the detected magnetic fluxes exhibit a normal distribution as shown by a broken line 1 in FIG. 1. On the other hand, when planar magnetic particles 4, each having an easy magnetization axis 5 perpendicular to the major surface thereof, (e.g., barium ferrite, such as $BaFe_{12}O_{19}$, $Ba_2Me_2Fe_{12}O_{22}$, $Ba_3Me_2Fe_{24}O_{41}$, $Ba_3Co_{1.92}Fe_{0.0\text{-}8}Fw_{24}O_{41}$ as shown in FIG. 2 are dispersed in a magnetic film, the major surface of the planar magnetic particles tends to be arranged in parallel to the surface of an aluminum or polyester substrate particularly when the substrate is a disc which rotates during spin-coating. In this case, the easy magnetization axis 5 of the planar magnetic particle 4 is oriented perpendicular to the surface of the magnetic film.

In such a case, the detected fluxes exhibit an abnormal asymmetric distribution, as shown by a one-point broken line 2 in FIG. 1. Furthermore, a practical magnetic recording medium, which contains perpendicular barium ferrite particles, has a certain amount of longitudinal magnetic components. Thus, the broken line 1 and one-point broken line 2 are synthesized, and thereby the detected curve is deformed as shown by a solid line 3 in FIG. 1, and the peak of the detected flux is dislocated from the original point. It is necessary to pass the detected signal through a correction circuit which comprises a delay circuit, an attenuator, etc., prior to the writing and reading of information. In addition, the output and practical recoding density are inevitably low.

The hexagonal crystal platelets with easy magnetization axes normal to their planes such as barium ferrite $BaFe_{12}O_{19}$ etc are recognized to be effective for improving the recording density. However, barium ferrite is not practically used to produce a perpendicular recording medium due to the above-mentioned defects. Furthermore a longitudinal magnetic coated recording medium comprising barium ferrite is not realized, because it is difficult to form a longitudinal magnetic film therefrom.

Wada et al, Japanese Unexamined Patent Publication No. 57-212623, assigned to Toshiba Denki K.K., discloses a magnetic recording medium which contains barium ferrite type magnetic particles with an average size of 0.3 $\mu$m in an amount of at least 50% by weight of the total magnetic particles. Wada et al includes $\gamma$-$Fe_2O_3$ type or cobalt type magnetic particles with an average size of 0.4 $\mu$m. However, Wada et al does not teach or suggest the application of a magnetic field prior to drying the magnetic paint.

Kishimoto et al, Japanese Unexamined Patent Publication No. 59-129933 assigned Hitachi Maxell discloses a magnetic recording medium which contains barium ferrite magnetic particles having an easy magnetization axis perpendicular to the major surface thereof and other magnetic particles having an isometric magnetic axis. However, Kishimoto et al teaches the application of a magnetic field perpendicular to the surface of the film base, thereby forming a perpendicular magnetic coated recording medium.

Taniguchi, Japanese Unexamined Patent Publication No. 52-141612, assigned to Hitachi Maxell K.K. discloses a process for producing a magnetic recording medium wherein the surface of a substrate is coated with a magnetic paint. The painted substrate is then passed through a magnetic field which arranges the magnetic particles (e.g., $\gamma$-$Fe_2O_3$), dispersed in the magnetic paint in parallel to the running direction of the substrate, and then the paint is dried. However, Taniguchi does not teach the use of planar magnetic particles having an easy magnetization axis perpendicular to the major surface thereof.

Ishida et al, Japanese Unexamined Patent Publication No. 54-9905, assigned Fujitsu K.K. discloses a process for producing a magnetic recording disc, comprising the steps of: forming a magnetic film containing isometric magnetic particles, i.e., $\gamma$-$Fe_2O_3$, on the disc, applying a magnetic field perpendicular to a surface of the disc, and then applying an intrafacially orienting magnetic field parallel to the running direction of the disc. However, Ishida et al does not teach or suggest the application of a longitudinal magnetic field solely, or alternately with a perpendicular magnetic field, to a planar magnetic powder having an easy magnetization axis perpendicular to the major surface thereof.

Yokoyama et al, Japanese Unexamined Patent Publication No. 58-6526, assigned Toshiba Denki K.K. discloses a magnetic recording medium produced by painting a substrate with a resinous compound comprising planar magnetic particles each having an easy magnetization axis perpendicular to the major surface of the particle (e.g., hexagonal ferrite crystals). The substrate is painted to a thickness of at 0.2 $\mu$m maximum, and has a ratio of diametric size to thickness of at least 2, the particles being magnetically arranged in the moving direction of a magnetic head. However, Yokoyama et al does not teach the process whereby the planar magnetic particles are oriented, except that a magnetic field of 2 kOe is applied to a polyethylene film coated with the magnetic resin and calendered to form a recording tape having a ratio of residual magnetization to saturation magnetization of 0.9. Yokoyama et al does not refer to the orientation angle, which the inventors originally defined as an angle where the ratio of residual magnetization to saturation magnetization Mr/Ms is the largest. In addition, it seems that the ratio of residual magnetization to saturation magnetization is 0.9, which appears to be too large to be actually attained. Moreover, the magnetic medium with barium ferrite particles magnetically arranged in the moving direction of a magnetic head inevitably contains many pinholes, and, therefore, it can not be put into practical use.

SUMMARY OF THE INVENTION

It is an object of the present invention to provide a magnetic recording medium which dispenses with the correction of an output wave.

It is another object of the present invention to provide a magnetic recording medium which exhibits a high recording characteristic, i.e., a high value of the product of output and recording density.

It is still another object of the present invention to provide a magnetic recording medium which exhibits reduced noise.

It is yet another object of the present invention to provide a process for producing a longitudinal magnetic coated recording medium which exhibits the advantages set forth above.

Barium ferrite and strontium ferrite are typical planar magnetic particles which have an easy magnetization axis 5 perpendicular to the major surface of the particle 4, as shown in FIG. 2. According to the present invention, these particles are dispersed in a magnetic paint which is applied on a substrate. The ratio of diametric size to thickness of the planar magnetic particles may be more than 3.5, and the diametric size thereof may be in the range of 0.1 to 0.3 μm. In order to orient the easy magnetization axis of the planar magnetic particles in parallel to the surface of the magnetic film, it is necessary for the planar magnetic particles to be stood upright by applying a magnetic field substantially in parallel to the surface of the magnetic film until the magnetic paint dries.

On the other hand, in order to distribute the planar magnetic particles uniformly throughout the magnetic film, it is preferably to alternately apply a magnetic field substantially in parallel to the surface of the magnetic film and another magnetic field perpendicular to the surface of the magnetic film prior to the drying step. Particularly in the case of a disc substrate, it is also advantageous to apply a magnetic field perpendicular to the surface of the magnetic film during the coating step, thereby avoiding an uneven accumulation of the planar magnetic particles.

In order to prevent the occurrence of pin holes on the surface of the magnetic film, it is advisable to prepare a magnetic paint in which other particles, in an amount of 10 to 30% based on the total weight of the planar magnetic particles and the other particles, are dispersed. The other particles set forth above may have a size in a range from 0.05 to 0.4 μm, and may be either magnetic particles such as $\gamma$-$Fe_2O_3$ and cobalt adsorbed $\gamma$-$Fe_2O_3$, or nonmagnetic particles such as $\alpha$-$Fe_2O_3$, $\alpha$-$Al_2O_3$ and $SiO_2$. For convenience a magnetic paint can be prepared by blending a paint of the plane magnetic particles, and another paint of the other particles. Thus, each of the two kinds of particles are uniformly dispersed in the paint.

When the recording medium is a disc, which is spun-coated with a magnetic paint, it is advantageous to rotate the disc at a peripheral speed of, at most, 7 m/s, in order to avoid dropping of the plane magnetic particles, and, to rotate the disc in the orientation step at a speed lower than in the coating step.

A longitudinal magnetic coated recording medium according to the present invention essentially exhibits an output wave having a symmetrical normal distribution as shown by the broken line 1 in FIG. 1, contrary to the perpendicular magnetic coated recording medium, and thus, wave correction can be eliminated. In addition, this longitudinal magnetic coated recording medium exhibits a low noise and a high output. Although the recording density is somewhat lower than the conventional perpendicular recording medium, the practical recording density at which the peak-shift has a 10% deviation is higher than that of the perpendicular recording medium. The recording performance defined as the product of the output and the recording density, is also higher than that of the perpendicular recording medium. We found that this recording characteristic exhibits a desirable value when the orientation angle is in the range of $-30°$ to $+30°$. The orientation angle is defined herein as an angle at which the orientation degree, i.e., the ratio of residual magnetization to saturation magnetization Mr/Ms, is largest. The orientation angle is the angle between the film plane and easy axis of magnetization.

The longitudinal magnetic coated recording medium according to the present invention preferably exhibits a Mr/Ms ratio, in the direction parallel to the surface of the magnetic film, of at least 0.65, and/or the coercive forces $H_c$ in the direction parallel and perpendicular, respectively, to the surface of the magnetic film are approximately equal in the range of ±5%.

Figure 15:
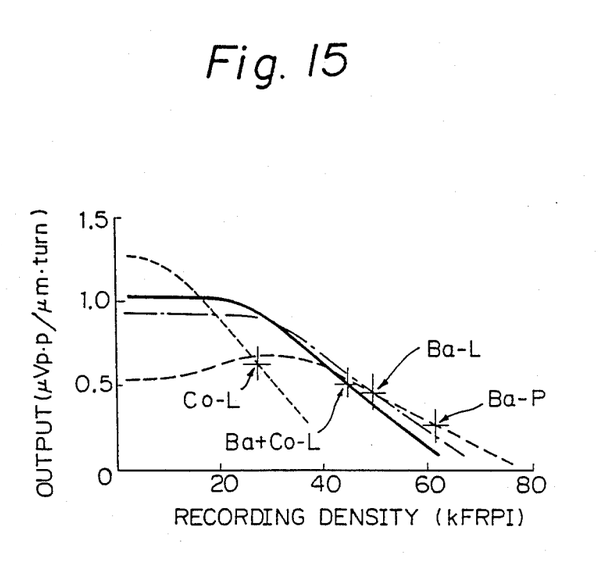
FIG. 15 is a graph showing the relationship between recording density and an output.

FIG. 15 shows the relationships between the recording density and output for magnetic films containing longitudinally oriented barium ferrite (Ba—L) particles, longitudinally oriented 20% by weight of cobalt adsorbed $\gamma$-$Fe_2O_3$ mixed barium ferrite (Ba+Co—L) particles, longitudinally oriented cobalt adsorbed $\gamma Fe_2O_3$ (Co—L) particles, and perpendicularly oriented barium ferrite (Ba—P) particles. It can be seen that Ba+Co-L particles show a higher out put than those containing Ba—P and Ba—L particles, and that the recording density thereof is much larger than that containing the longitudinally oriented Co-L particles.

The recording density, the practical recording density at which the peak-shift has a 10% deviation, and the ratio of the latter to the former referring to the magnetic films set forth above are shown in Table 1, below.

TABLE 1

| Disk | $D_{50}$ (kFRPI) | $D_{PS.10}$ (kFRPI) | $D_{PS.10}/D_{50}$ (%) |
|---|---|---|---|
| Ba—P | 62 | 37 | 60 |
| Ba—L | 51 | 42 | 82 |
| Ba + Co—L | 46 | 42 | 91 |
| Co—L | 28 | 27 | 96 |

DESCRIPTION OF THE PREFERED EMBODIMENTS

The present invention will be more readily understood by reference to the following detailed description taken in conjunction with the accompanying drawings.

The following examples refer to magnetic recording discs, and thus include parameters of centrifugal force, i.e., number of rotations which correspond to the circular speed of the disc.

EXAMPLE 1

Hexagonal plane barium ferrite particles 4 as shown in FIG. 2 and having diametric size (d) of about 0.2 μm, and a thickness (t) of about 0.02 μm were used as magnetic particles, and a magnetic paint was prepared according to the composition shown in Table 2.

TABLE 2

| Composition of Magnetic Paint | |
|---|---|
| Barium ferrite | 55 (parts by weight) |
| Epoxy resin | 30 |
| Phenolic resin | 10 |
| Acrylic resin | 5 |
| Thinner | 420 |
| (Xylene:Toluene:Cellulose Acetate = 3:3:1) | |

Figure 3:
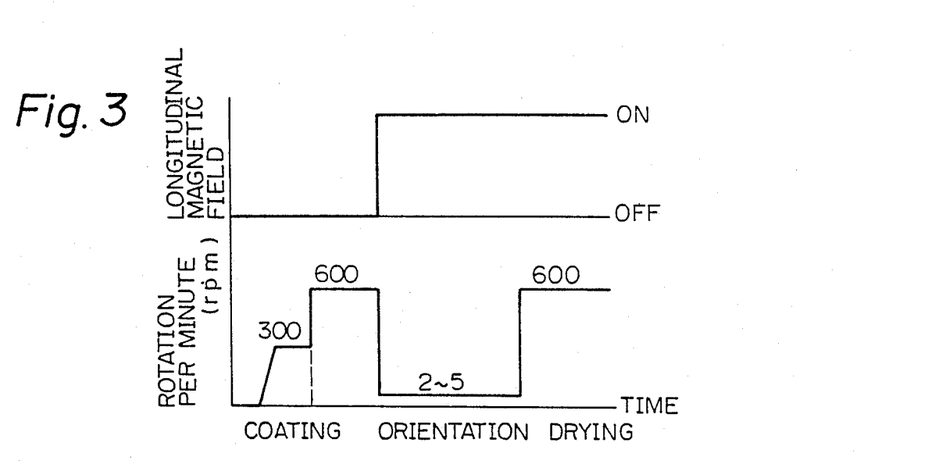
FIG. 3 is a graph showing the process for producing a longitudinal magnetic coated recording disc.

An aluminum disc 20.3 cm in diameter was spin-coated with the magnetic paint at 300 rpm and, thereafter, excess magnetic paint was spun off at 600 rpm which corresponds to about 6.5 m/s peripheral speed. Then, the rotation was slowed to 2 to 5 rpm as shown in FIG. 3, and this slow rotation was maintained for about one minute, in order to prevent the plane surface of the particles from lying parallel to the surface of the magnetic film due to the centrifugal force. During the slow rotation, a 4 kOe longitudinal magnetic field was applied in parallel to the surface of the magnetic film. After the one minute period set forth above had elapsed, the rotation was raised again to 600 rpm, while application of the longitudinal magnetic field was maintained. Thus, the easy magnetization axis of the plane magnetic particles was oriented in parallel to the surface of the magnetic film, and the magnetic film was dried, thereby forming a so-called longitudinal magnetic film about 0.5 μm in thickness. A magnetic recording disc thus produced was tested with an Mn-Zn ring-head of 0.2 μm gap length. The write and read characteristics, i.e., output, recording density, recording density at ±10% peak-shift, and overwrite at 15/30 kFRPI with the same current of 35 mA were determined, as shown in column (A) of Table 3.

Corresponding data obtained from a conventional perpendicular magnetic coated recording disc, which was produced by a process similar to that set forth above except for applying a magnetic field perpendicular to the surface of the magnetic film, are shown in column (B) of Table 3.

TABLE 3

| | (A) Longitudinal | (B) Perpendicular |
|---|---|---|
| Output (mV) | 0.82 | 0.45 |
| Recording Density D₅₀ (kFRPI) | 55 | 60 |
| Recording Density at ±10% Peak-shift D$_{ps.10}$ (kFRPI) | 42 | 37 |
| Overwrite (dB) | −40 | −20 |

As can be seen from Table 3, a longitudinal magnetic coated recording disc exhibits a much higher output, a higher recording density after calibration of the peak-shift, and a better overwrite characteristic than those of the perpendicular magnetic coated recording disc.

Figure 4A:
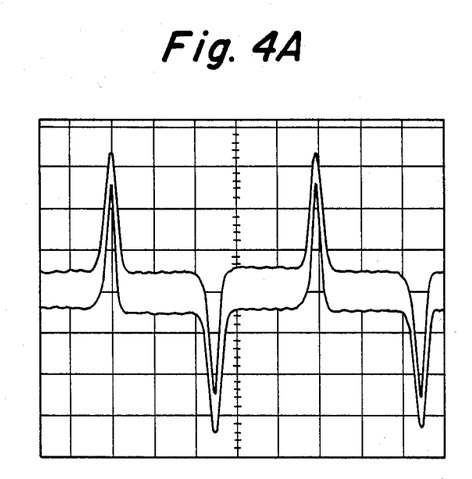
FIG. 4(A) is an oscillograph of an output wave of a longitudinal magnetic coated recording disc.
Figure 4B:
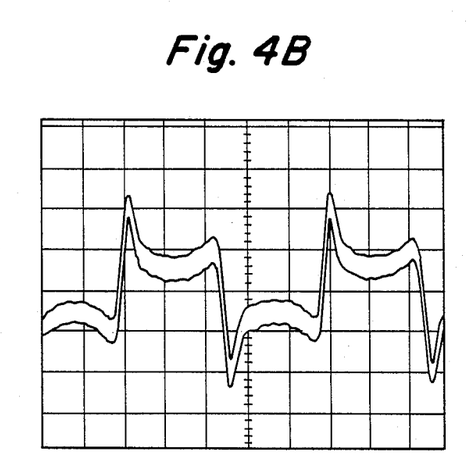
FIG. 4(B) is an oscillograph of an output wave of a perpendicular magnetic coated recording disc.

FIGS. 4(A) and (B) are oscillograph diagrams of the output of a magnetic recording disc detected by means of a ring head. The curve (A) is obtained using a longitudinal magnetic coated recording disc, and exhibits a symmetrical curve. Contrary to this, a conventional perpendicular magnetic coated recording disc exhibits an asymmetric curve (B).

EXAMPLE 2

Figure 5A:
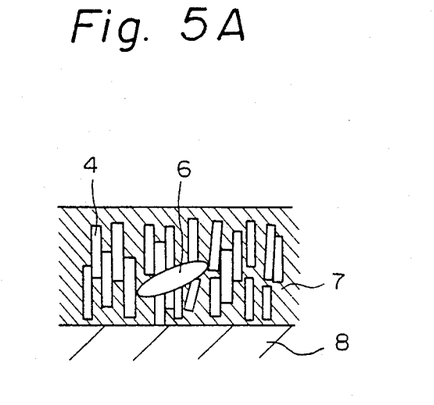
FIG. 5(A) is a sectional view of a film containing a cobalt adsorbed γ-Fe₂O₃ filler blended with barium ferrite.
Figure 5B:
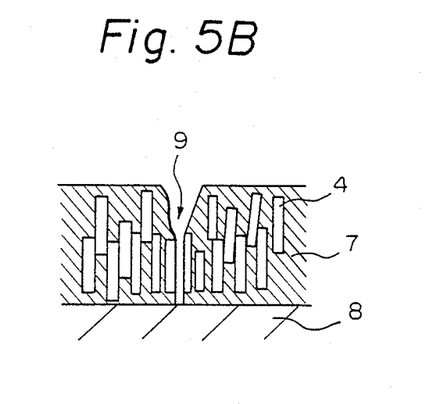
FIG. 5(B) is a cross-sectional view of a film containing barium ferrite alone.

Hexagonal planar barium ferrite particles similar to those used in Example 1, were mixed with acicular cobalt absorbed γ-Fe₂O₃ filler particles 6, as shown in FIG. 5, each particle having a mean size of 0.3 to 0.4 μm in a weight ratio of 4:1. Then, a magnetic paint was prepared according to the composition shown in Table 4.

TABLE 4

| Composition of Magnetic Paint | |
|---|---|
| Barium ferrite | 44 (parts by weight) |
| Cobalt γ-Fe₂O₃ | 11 |
| Epoxy resin | 30 |
| Phenolic resin | 10 |
| Acrylic resin | 5 |
| Thinner | 420 |

TABLE 4-continued

Composition of Magnetic Paint $$\begin{pmatrix} \text{Xylene:Toluene:Cellulose Acetate} \\ 3 \quad\quad 3 \quad\quad\quad 1 \end{pmatrix}$$

Figure 6A:
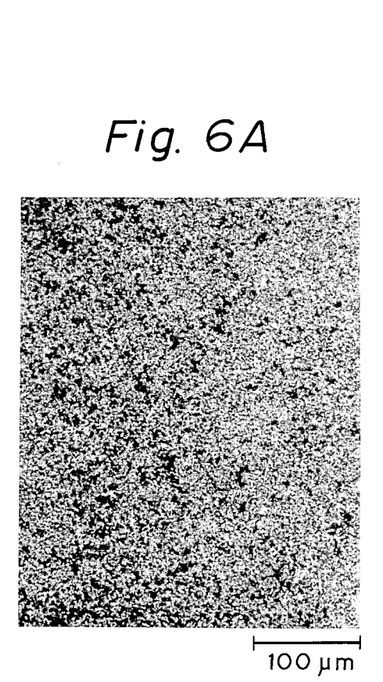
FIG. 6(A) is a photograph, taken through a microscope, of the surface of a longitudinal magnetic coated recording disc, in which the magnetic film contains a cobalt adsorbed γ-Fe₂O₃ filler.
Figure 6B:
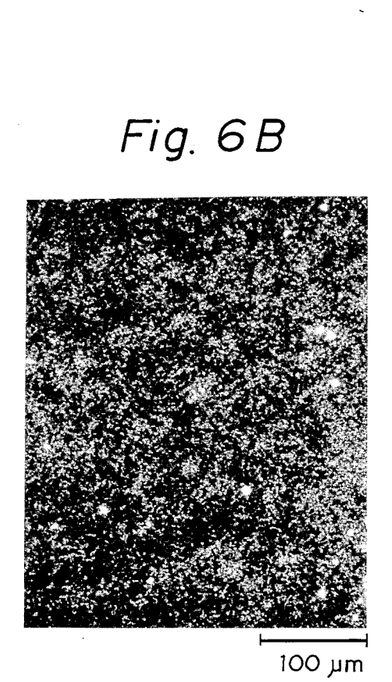
FIG. 6(B) is a photograph, taken through a microscope of the surface of a longitudinal magnetic coated recording disc, in which the magnetic film conains barium ferrite alone.

The process of spin-coating the magnetic paint, orientation of the barium ferrite particles, and drying of the magnetic paint were carried out in a manner similar to that of Example 1. A magnetic film 7 formed on the disc 8, as shown in FIG. 5(A), exhibits a uniform surface structure under a microscope as shown in FIG. 6 (A). Contrary to this, the magnetic recording disc obtained in Example 1 exhibits pin-holes 9 on the surface, as shown in FIGS. 5(B) and 6(B) which causes the generation of noise. Thus, the magnetic film 7 eliminates the pinholes 9 where the plane magnetic particles 4 are not densely arranged.

This magnetic recording disc was tested as follows. A 10 kOe magnetic field was applied parallel to the surface of the disc, and the ratio of residual magnetization to saturation magnetization in the longitudinal direction Mr/Ms// was measured by means of a vibrated sample magnetic meter. The disc was rotated at a speed of 20 m/s, and the recording density was determined by means of a Mn-Zn ring head having a gap length of 0.3 $\mu$m, and noise was integrated in the region of up to 10 MHz after DC erasing. These characteristic values are shown in column (A) in Table 5, and those obtained by the disc of Example 1 are shown in column (B) in Table 5.

TABLE 5

|  | (A) | (B) |
| --- | --- | --- |
| Degree of Orientation (Mr/Ms//) | 0.70 | 0.72 |
| Recording Density D$_{50}$ (kFRPI) | 53 | 56 |
| Noise, 10 MHz band ($\mu$Vrms) | 6.5 | 13 |

Figure 7:
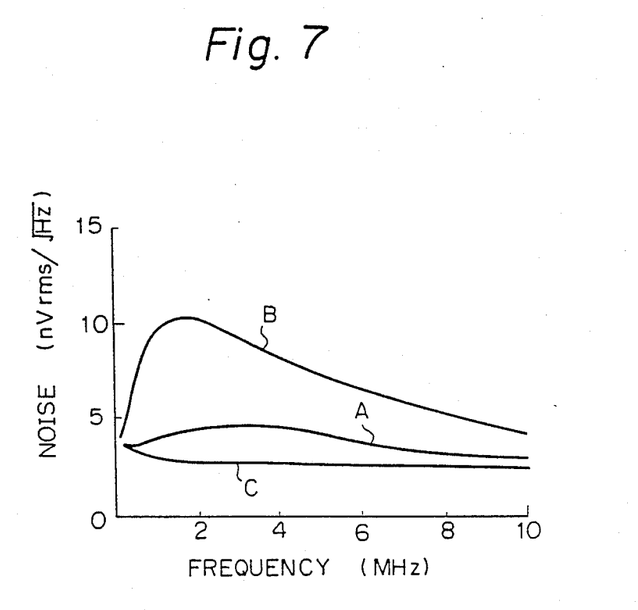
FIG. 7 is a graph showing the relationship between the frequency and noise of longitudinal and perpendicular magnetic coated recording discs.

The noise of the disc in column (A) of Table 5 is reduced to half of tht obtained by the magnetic recording disc of Example 1 as shown by curve (A) in FIG. 7, as compared with curve (B) which is obtained by a magnetic recording disc according to Example 1. In the diagram, curve (C) represents amplifier noise.

EXAMPLE 3

Hexagonal planar barium ferrite particles having a diametric size of about 0.2 $\mu$m and a thickness of about 0.01 $\mu$m were mixed with nonmagnetic $\alpha$-Fe$_2$O$_3$ particles having a mean size of about 0.3 to 0.4 $\mu$m in a weight ratio of 4:1. A magnetic paint was prepared according to the composition shown in Table 3, except that cobalt absorbed $\gamma$-Fe$_2$O$_3$ was replaced with $\gamma$-Fe$_2$O$_3$. A longitudinal magnetic coated recording disc was produced similar to Example 2, and the obtained recording properties were similar to those of Example 2.

EXAMPLE 4

Hexagonal barium ferrite particles having a diametric size of about 0.2 $\mu$m and a thickness of about 0.02 $\mu$m were mixed with other components to prepare a paint of the composition shown in Table 6(A). A filler paint was prepared using cobalt adsorbed $\gamma$-Fe$_2$O$_3$ particles having a mean size of, at most, 0.2 $\mu$m, according to the composition shown in Table 6(B).

TABLE 6

| | (parts by weight) | |
| --- | --- | --- |
| | (A) | (B) |
| Barium ferrite | 38 | — |
| Cobalt $\gamma$-Fe$_2$O$_3$ | — | 17 |
| Epoxy resin | 25 | 5 |
| Phenolic resin | 5 | 5 |
| Acrylic resin | — | 5 |
| Toluene | 115 | 35 |
| Xylene | 115 | 35 |
| Cellosolve acetate | 40 | 10 |

These paints were blended in a sand grinder for 3 hours, and then the same amount of each paint was mixed and blended again in a sand grinder for 3 hours, whereby a magnetic paint having a viscosity of 0.9 poise was prepared. Then, a longitudinal magnetic coated recording disc was produced similar to the process of Example 1.

Using a ring head having a gap length of 0.2 $\mu$m, noise was detected in the frequency range of up to 10 MHz. The noise was 4.5 $\mu$Vrms.

Contrary to this, when the compounds shown in Tables 6(A) and (B) were previously mixed and blended for 6 hours, thus producing the magnetic paint in one step, the noise was 5.5 $\mu$Vrms.

EXAMPLE 5

A filler paint was prepared having a similar composition to that shown in Table 6(B), except that cobalt absorbed $\gamma$-Fe$_2$O$_3$ was replaced with nonmagnetic $\alpha$-Fe$_2$O$_3$ having a mean size of 0.3 to 0.4 $\mu$m. The filler paint was blended with the paint obtained according to the composition shown in Table 6(A). Next, a magnetic recording disc was produced similar to the process of Example 4. The noise detected from a disc in which the magnetic paint was prepared by this two step process was 6.2 $\mu$Vrms, as compared with 8.0 $\mu$Vrms from a disc in which the magnetic paint was prepared in one step.

EXAMPLE 6

A barium ferrite magnetic paint and an $\alpha$-Fe$_2$O$_3$ filler paint were prepared according to the compositions shown in Table 7(A), and 7(B), respectively.

TABLE 7

| | (parts by weight) | |
| --- | --- | --- |
| | (A) | (B) |
| Barium ferrite | 44 | — |
| $\alpha$-Fe$_2$O$_3$ | — | 11 |
| Epoxy resin | 25 | 5 |
| Phenolic resin | 5 | 5 |
| Acrylic resin | — | 5 |
| Toluene | 95 | 55 |
| Xylene | 95 | 55 |
| Cellosolve acetate | 35 | 15 |

The paints were then blended as in Example 4. Thus, a magnetic paint was prepared and a longitudinal magnetic coated recording disc was produced in a process similar to Example 4. The noise was 6.6 $\mu$Vrms, as compared with 8.0 $\mu$Vrms obtained by a disc in which the magnetic paint was prepared in one step.

EXAMPLE 7

A barium ferrite paint and an α-Al₂O₃ filler paint were prepared according to the compositions shown in Table 8(A) and (B), respectively.

TABLE 8

| | (parts by weight) | |
|---|---|---|
| | (A) | (B) |
| Barium ferrite | 44 | — |
| α-Al₂O₃ | — | 11 |
| Epoxy resin | 25 | 5 |
| Phenolic resin | 5 | 5 |
| Acrylic resin | — | 5 |
| Toluene | 105 | 45 |
| Xylene | 105 | 45 |
| Cellosolve acetate | 40 | 10 |

The paints were then blended as in Example 4.

A magnetic paint thus prepared was used in producing a longitudinal magnetic coated recording disc in a process similar to Example 4. The noise was 6.6 μVrms, as compared with 8.0 μVrms obtained by a disc in which the magnetic paint was prepared in one step.

EXAMPLE 8

Figure 8:
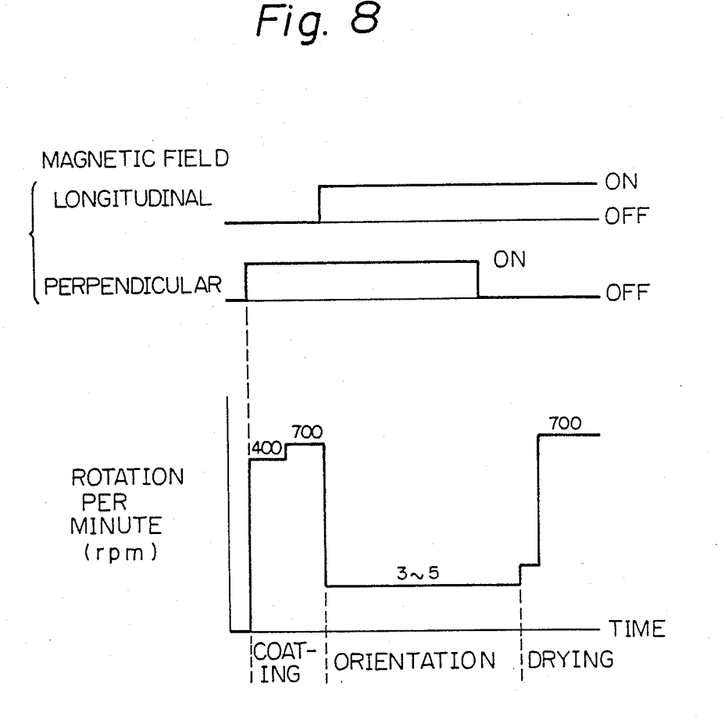
FIG. 8 is another graph of a process for producing a longitudinal magnetic coated recording disc.

An aluminum disc of 20.3 cm diameter was spin coated with the same magnetic paint prepared according to the composition of Example 1, and as shown in FIG. 8, the disc was rotated at 400 rpm, and thereafter at 700 rpm to flow off excess paint, and a magnetic field was then applied perpendicular to the surface of the disc, thereby distributing the planar particles of barium ferrite uniformly on the disc.

The rotation was slowed to 3–5 rpm, and magnetic fields longitudinal and perpendicular to the surface of the disc were alternately, respectively, applied for 5 minutes, whereby the orientation of the major surface of the planar particles was alternately changed to prevent mutual coagulation of the particles. Thereafter, the perpendicular magnetic field was cut and only the longitudinal magnetic field was applied, the rotation was again raised to 700 rpm, and the magnetic paint was dried.

The obtained magnetic recording disc exhibited a degree of longitudinal orientation Mr/Ms of 0.70 and a recording density of 53 kFRPI.

EXAMPLE 9

A magnetic paint of the composition shown in Table 4, Example 2 was applied on an aluminum disc 20.3 cm in diameter.

During the spin-coating, no magnetic field was applied to the disc which was rotated at 500 rpm. The orientation and drying steps were carried out as in Example 2. The obtained longitudinal magnetic coated disc exhibited the parameters shown in Table 9.

TABLE 9

| | |
|---|---|
| Degree of Longitudinal Orientation (Mr/Ms//) | 0.69 |
| Recording Density D₅₀ (kFRPI) | 53 |
| Noise, 10 MHz band (μVrms) | 5 |
| S/N (d/B) | 34 |

EXAMPLE 10

Various longitudinal magnetic coated recording discs were produced as in Example 2, except that the rotation speed in the coating steps was varied in a range of 300 to 1500 rpm.

A 10 kOe magnetic field was applied at various angles from the surface of the magnetic film. The ring head had a gap length of 0.2 μm.

The ratio of residual magnetization to saturation magnetization Mr/Ms, i.e., degree of longitudinal orientation, was determined for each disc.

Figure 9:
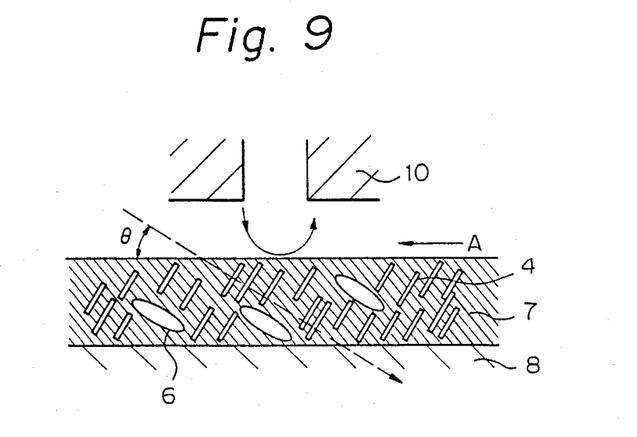
FIG. 9 is a cross-sectional view of a magnetic film indicating the direction of orientation angle.

The angle $\theta$, in which the value Mr/Ms is largest was defined as the orientation angle, and denominated minus for the case when the orientation angle $\theta$ declined in the opposite direction to that which the magnetic flux from the ring head 10 curved, as shown in FIG. 9. The output $e_0$ and recording density $D_{50}$ (see FIG. 10) were detected by means of the ring head set forth above and their product was calculated for each disc. Their product values were plotted against the orientation angle in FIG. 10. The vertical axis is relatively graduated by setting the product of output $e_0$ and recording density.

Figure 10:
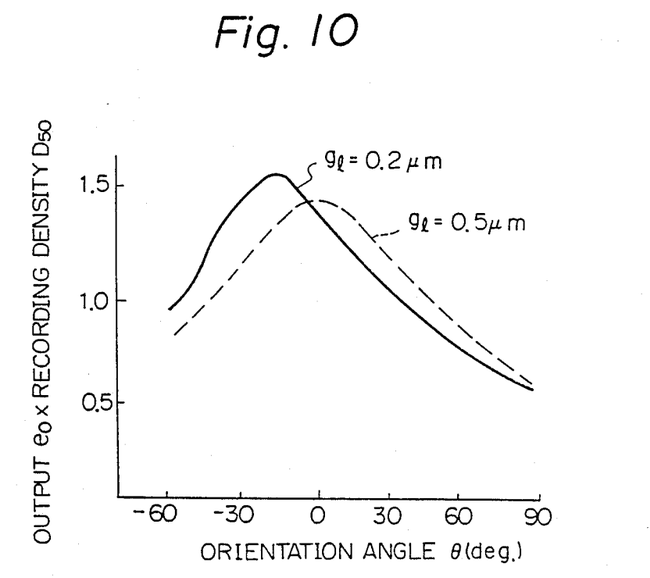
FIG. 10 is a graph showing the relationship between recording characteristic and orientation angle.

It was found that the desirable values of the product of output $e_0$ and recording density $D_{50}$ fall within the range of an orientation angle of from $-30°$ to $+30°$, as shown in FIG. 10.

The longitudinal magnetic coated recording disc produced by applying 600 rpm in Example 1 exhibited an orientation angle of 0°, when the orientation degree, recording density and output were detected similarly, except that a ring head having a gap length of 0.5 μm was used.

EXAMPLE 11

Figure 11:
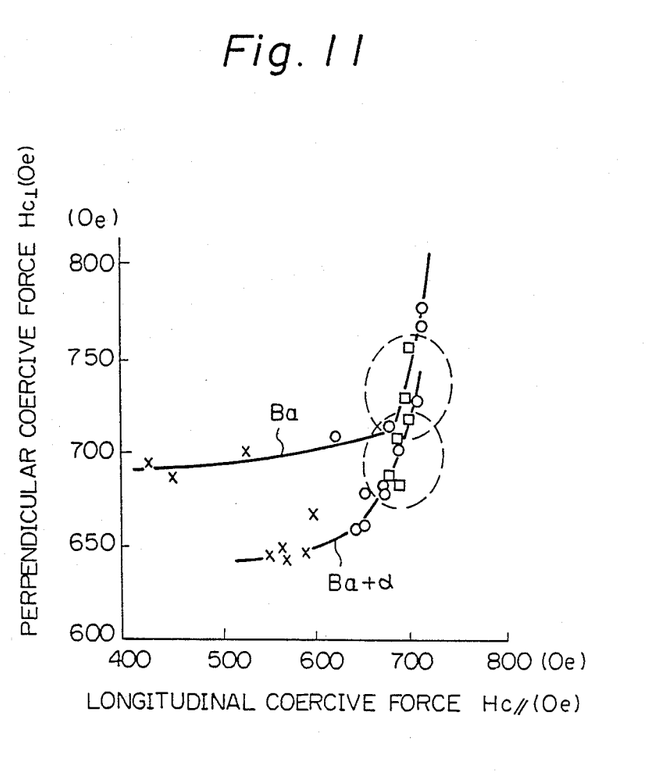
FIG. 11 is a graph showing the relationship between recording characteristic and longitudinal and perpendicular coercive forces.

Longitudinal magnetic coated recording discs were produced according to Examples 1 and 2 except for changing the rotation speed. The degree of orientation, and recording density $D_{50}$ were determined as in Example 2. The output $e_0$ and longitudinal and perpendicular coercive forces Hc were also determined. The product of output $e_0$ and recording density $D_{50}$ was calculated to obtain a recording characteristic value. FIG. 11 shows the relationship between longitudinal and perpendicular coercive forces Hc// and Hc⊥, and the recording characteristic values are marked as □, o and ×, respectively, when the values are at least 50 mV kFRPI, 40 to 50 mV×kFRPI, and less than 40 mV×kFRPI, respectively. A Ba curve was obtained using barium ferrite discs, and a Ba+α curve was obtained using disks of barium ferrite mixed with cobalt adsorbed γ-Fe₂O₃.

Both curves exhibited □ marks in the area in which the longitudinal an perpendicular coercive forces Hc// and Hc⊥ are approximately equal to 700 Oe.

EXAMPLE 12

Figure 12:
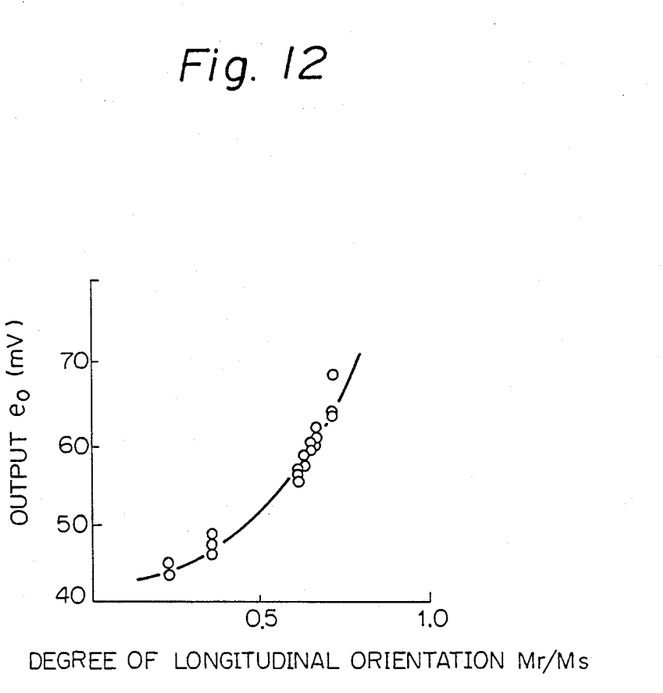
FIG. 12 is a graph showing the relationship between output and the degree of longitudinal orientation.
Figure 13:
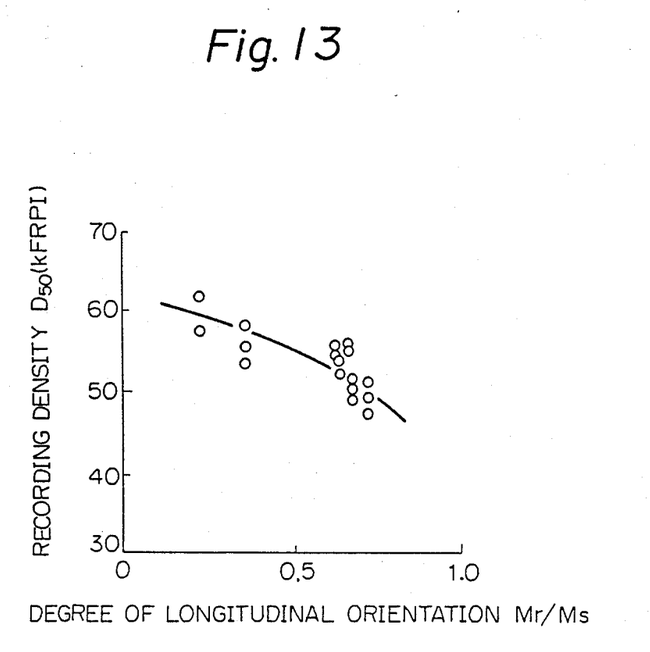
FIG. 13 is a graph showing the relationship between recording density and the degree of longitudinal orientation.
Figure 14:
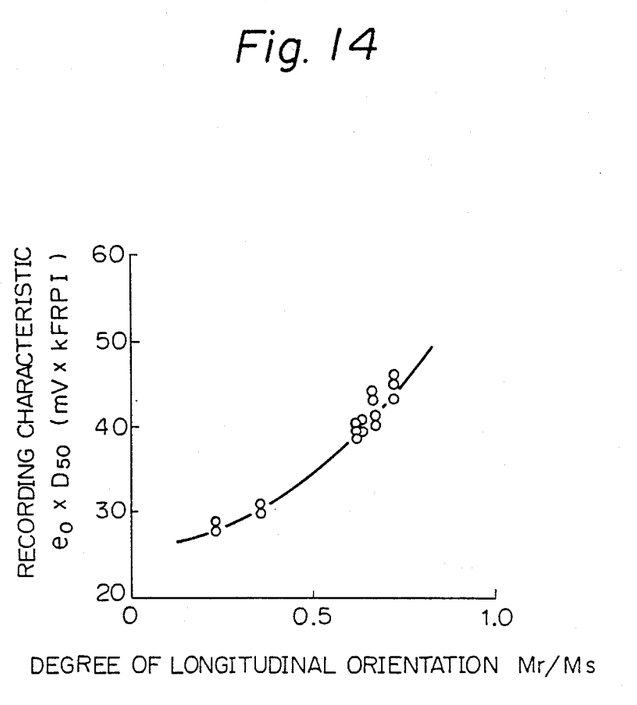
FIG. 14 is a graph showing the relationship between the degree of longitudinal orientation and a recording characteristic.

Longitudinal magnetic coated recording discs were produced according to Example 1, except that the rotation speed was changed. The ratio of residual magnetization to saturation magnetization Mr/Ms in the longitudinal direction was determined as in Example 2. The output $e_0$ and recording density $D_{50}$ were determined by means of a ring head having a gap length of 0.2 μm, while the discs were rotated at a peripheral speed of 12.4 m/s. The output $e_0$ sharply increases, as shown in FIG. 12, and the recording density gradually decreases as shown in FIG. 13, with the increase in longitudinal degree of orientation. The product of output $e_0$ and recording density $D_{50}$ is 40 mV kFRPI, when the degree of longitudinal orientation is at least 0.65, as shown in FIG. 14.

What is claimed is:

1. A process for producing a longitudinal magnetic coated recording medium, which includes a magnetic film moving relative to a magnetic head, said magnetic film having an orientation angle of $-30°$ to $+30°$ between the surface of said magnetic film and an easy axis of magnetization of said magnetic film, said orientation angle being determined by an angle where the ratio of residual magnetization to saturation magnetization MR/MS is largest, comprising the steps of:
   (1) preparing a magnetic paint having planar magnetic particles, each particle having an easy magnetization axis perpendicular to a planar surface thereof dispersed therein;
   (2) coating a nonmagnetic substrate with said magnetic paint, and forming a magnetic film having a surface;
   (3) alternately applying a first magnetic field approximately perpendicular to the surface of said magnetic film and a second magnetic field parallel to the surface of said magnetic film, and orienting the easy magnetization axis of said planar magnetic particles dispersed in said magnetic film; and
   (4) drying said magnetic paint, while applying said first magnetic field.

2. A process according to claim 1, wherein step 1 includes dispersing other particles different in composition from said magnetic particles in an amount of 10% to 30% based on a combined weight of said planar magnetic particles and said other particles in said magnetic paint.

3. A process according to claim 1, wherein said planar magnetic particles are hexagonal crystals selected from the group of barium ferrite and strontium ferrite.

4. A process according to claim 2, wherein said step 1 includes:
   (a) preparing a first paint in which said planar magnetic particles are dispersed;
   (b) preparing a second paint in which said other particles are dispersed; and
   (c) blending the two paints, thereby preparing said magnetic paint.

5. A process according to claim 4, wherein said other particles are magnetic particles from the group of acicular $\gamma$-$Fe_2O_3$ and cobalt adsorbed $\gamma$-$Fe_2O_3$.

6. A process according to claim 4, wherein said other particles are nonmagnetic particles selected from the group of $\alpha$-$Al_2O_3$ and $SiO_2$.

7. A process according to claim 1, wherein the diametric size of each of said planar magnetic particles is in the range of 0.1 to 0.3 $\mu$m.

8. A process according to claim 2, wherein the size of each of said other particles is in the range of 0.05 to 0.4 $\mu$m.

9. A process according to claim 2, wherein said nonmagnetic substrate is a disc, and said disc is rotated at a maximum peripheral speed of 7 m/s throughout steps 2, 3, and 4.

10. A process according to claim 9, wherein said disc is rotated during step 3 at a speed lower than that of step 2.

* * * * *